(12) United States Patent
Fang et al.

(10) Patent No.: US 11,888,657 B2
(45) Date of Patent: Jan. 30, 2024

(54) RECONSTRUCTION METHOD AND DEVICE FOR MULTI-CARRIER DIFFERENTIAL CHAOS SHIFT KEYING (DCSK) SIGNAL

(71) Applicant: Guangdong University of Technology, Guangzhou (CN)

(72) Inventors: Yi Fang, Guangzhou (CN); Yiwei Tao, Guangzhou (CN); Liang Lv, Guangzhou (CN); Yujing Lu, Guangzhou (CN); Guojun Han, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/464,128

(22) Filed: Sep. 8, 2023

(65) Prior Publication Data

US 2023/0421419 A1 Dec. 28, 2023

(51) Int. Cl.
*H04L 27/00* (2006.01)
*H04L 27/148* (2006.01)
*H04L 27/12* (2006.01)

(52) U.S. Cl.
CPC ........... *H04L 27/001* (2013.01); *H04L 27/12* (2013.01); *H04L 27/148* (2013.01)

(58) Field of Classification Search
CPC ...... H04L 27/001; H04L 27/12; H04L 27/148
See application file for complete search history.

(56) References Cited

FOREIGN PATENT DOCUMENTS

| CN | 113595951 A | 11/2021 |
| CN | 113890805 A | 1/2022 |

OTHER PUBLICATIONS

Gang Zhang et al., "Performance analyze for MU-DCSK system based on orthogonal chaotic carrier", Systems Engineering and Electronics, vol. 39, No. 2, Feb. 2017, pp. 431-436.

*Primary Examiner* — Nader Bolourchi

(57) ABSTRACT

A reconstruction method for DCSK signals is provided. An information bit sequence to be transmitted is acquired, which is processed by serial-to-parallel conversion. A processed information bit sequence is input into a modulator for modulation to obtain a modulated signal matrix. Cross multiplication is performed between the modulated signal matrix and a chaotic signal to obtain an original information-bearing matrix, which is reconstructed according to a predetermined reconstruction matrix to obtain an information-bearing reconstruction matrix. A transmission symbol is generated according to the information-bearing reconstruction matrix and a reference signal matrix in combination with frame structure information of the transmission symbol, and is sent to a receiving end via a wireless network to demodulate a received signal according to a reconstruction matrix. A reconstruction device for DCSK signals is also provided.

10 Claims, 8 Drawing Sheets

RECONSTRUCTION METHOD AND DEVICE FOR MULTI-CARRIER DIFFERENTIAL CHAOS SHIFT KEYING (DCSK) SIGNAL

CROSS-REFERENCE TO RELATED APPLICATIONS

This application claims the benefit of priority from Chinese Patent Application No. 202310574310.3, filed on May 22, 2023. The content of the aforementioned application, including any intervening amendments thereto, is incorporated herein by reference in its entirety.

TECHNICAL FIELD

This application relates to communication technology, and more particularly to a reconstruction method and device for a multi-carrier differential chaos shift keying (DCSK) signal.

BACKGROUND

The popularization of the information industry greatly promotes the growth of the mobile Internet services. The massive service data brings serious challenges to the next generation wireless communication network in terms of transmission rate, spectral efficiency, and reliability.

Chaotic communication is a scientific theory in which the chaotic signals are applied to the communication, and performed mainly based on excellent characteristics of chaotic signals such as determinism, initial condition sensitivity, wide spectrum, and noise-like characteristic. At present, the research of chaotic communication in wireless communication mainly focuses on chaotic digital modulation. Differential Chaos Shift Keying (DCSK) technology has been widely used in non-coherent chaotic digital modulation due to its advantages of low power consumption and low cost.

Currently, the mainstream DCSK communication technology is multi-carrier DCSK, which can be regarded as the parallel extension of typical DCSK. In the multi-carrier DCSK, one of the N subcarriers is used as a reference to transmit the chaotic reference signal, and the modulating data signal is transmitted on the remaining subcarriers, which can greatly improve the spectral efficiency. However, the desired bit error rate (BER) performance can only be achieved in flat fading channels, and the performance of the conventional multi-carrier DCSK will deteriorate under frequency-selective fading channels, thereby reducing the communication reliability of DCSK communication systems.

SUMMARY

This application provides a reconstruction method and device for a multi-carrier DCSK signal to solve the technical problem of low communication reliability in the existing multi-carrier DCSK communication systems.

Technical solutions of this application are described as follows.

In a first aspect, this application provides a reconstruction method for a multi-carrier Differential Chaos Shift Keying (DCSK) signal, comprising:
acquiring an information bit sequence to be transmitted;
processing the information bit sequence by serial-to-parallel conversion; and inputting a processed information bit sequence into a modulator for modulation to obtain a modulated signal matrix;
performing cross multiplication on the modulated signal matrix and a chaotic signal to obtain an original information-bearing matrix;
reconstructing the original information-bearing matrix according to a predetermined reconstruction matrix to obtain an information-bearing reconstruction matrix; and
generating a transmission symbol according to the information-bearing reconstruction matrix and a reference signal matrix in combination with frame structure information of the transmission symbol; and sending the transmission symbol to a receiving end via a wireless network to enable the receiving end to demodulate a received signal according to the predetermined reconstruction matrix.

In an embodiment, the step of "reconstructing the original information-bearing matrix according to a predetermined reconstruction matrix to obtain the information-bearing reconstruction matrix" comprises:
dividing the original information-bearing matrix into M original information-bearing submatrices according to the number M of subcarriers of a DCSK system;
according to M predetermined reconstruction matrices, performing a Hadamard product between each of the M original information-bearing submatrices and a corresponding predetermined reconstruction matrix to obtain M information-bearing reconstruction submatrices; and
summing the M information-bearing reconstruction submatrices to obtain the information-bearing reconstruction matrix.

In an embodiment, the received signal is demodulated by the receiving end according to the predetermined reconstruction matrix through steps of:
performing filter matching, by the receiving end, for the received signal, and obtaining a received signal matrix in combination with a predetermined channel response model matrix; and decomposing the received signal matrix into a reference matrix and an information-bearing matrix; and
calculating a decision metric matrix based on the reference matrix, the information-bearing matrix, and the predetermined reconstruction matrix; and restoring the received signal based on the decision metric matrix in combination with a decision rule.

In an embodiment, the received signal matrix is expressed as:

$$R_{k,rec}=[e_{k,ref}\hat{e}_{k,inf}]\otimes H+N;$$

wherein $R_{k,rec}$ is the received signal matrix; $e_{k,ref}$ is the reference signal matrix; $\hat{e}_{k,inf}$ is the information-bearing reconstruction matrix; H is the predetermined channel response model matrix; and N is an Additive White Gaussian Noise (AWGN) matrix; and
the decision metric matrix is expressed as:

$$D_{k,j}=R_{k,ref}*V\odot\Lambda_j\odot R_{k,inf};$$

wherein $R_{k,ref}$ is the reference matrix; $R_{k,inf}$ is the information-bearing matrix; * is a Kronecker product operation; V is an all-ones matrix with a size of 1×M; and $\Lambda_j$ is the predetermined reconstruction matrix.

In an embodiment, the reference signal matrix is generated through steps of equally distributing elements of the chaotic signal according to the number of subcarriers of a DCSK system to obtain the reference signal matrix.

In a second aspect, this application further provides a reconstruction device for a multi-carrier DCSK signal, comprising:
an information bit acquisition unit;
a signal modulation unit;
an original information-bearing matrix generating unit;
an information-bearing matrix reconstruction unit; and
a transmission symbol generating unit;
wherein the information bit acquisition unit is configured for acquiring an information bit sequence to be transmitted;
the signal modulation unit is configured for processing the information bit sequence by serial-to-parallel conversion, and inputting a processed information bit sequence into a modulator for modulation to obtain a modulated signal matrix;
the original information-bearing matrix generating unit is configured for performing cross multiplication on the modulated signal matrix and a chaotic signal to obtain an original information-bearing matrix;
the information-bearing matrix reconstruction unit is configured for reconstructing the original information-bearing matrix according to a predetermined reconstruction matrix to obtain an information-bearing reconstruction matrix; and
the transmission symbol generating unit is configured for generating a transmission symbol according to the information-bearing reconstruction matrix and a reference signal matrix in combination with frame structure information of the transmission symbol, and sending the transmission symbol to a receiving end via a wireless network to enable the receiving end to demodulate a received signal according to the predetermined reconstruction matrix.

In an embodiment, the information-bearing matrix reconstruction unit is further configured to perform:
dividing the original information-bearing matrix into M original information-bearing submatrices according to the number M of subcarriers of a DCSK system;
according to M predetermined reconstruction matrices, performing a Hadamard product between each of the M original information-bearing submatrices and a corresponding predetermined reconstruction matrix to obtain M information-bearing reconstruction submatrices; and
summing the M information-bearing reconstruction submatrices to obtain the information-bearing reconstruction matrix.

In an embodiment, the receiving end is configured for:
performing filter matching for the received signal, and obtaining a received signal matrix in combination with a predetermined channel response model matrix;
decomposing the received signal matrix into a reference matrix and an information-bearing matrix; and
calculating a decision metric matrix based on the reference matrix, the information-bearing matrix, and the predetermined reconstruction matrix; and restoring the received signal based on the decision metric matrix in combination with a decision rule.

In an embodiment, the received signal matrix is expressed as:

$$R_{k,rec}=[e_{k,ref}\hat{e}_{k,inf}]\otimes H+N;$$

wherein $R_{k,rec}$ is the received signal matrix; $e_{k,ref}$ is the reference signal matrix; $\hat{e}_{k,inf}$ is the information-bearing reconstruction matrix; H is the predetermined channel response model matrix; and N is an Additive White Gaussian Noise (AWGN) matrix; and
the decision metric matrix is expressed as:

$$D_{k,j}=R_{k,ref}*V\odot\Lambda_j\odot R_{k,inf};$$

wherein $R_{k,ref}$ is the reference matrix; $R_{k,inf}$ is the information-bearing matrix; * is a Kronecker product operation; V is an all-ones matrix with a size of 1×M; and $\Lambda_j$ is the predetermined reconstruction matrix.

In an embodiment, the reconstruction device of claim 6 further includes:
a reference signal matrix generating unit;
wherein the reference signal matrix generating unit is configured for equally distributing elements of the chaotic signal according to the number of subcarriers of a DCSK system to obtain the reference signal matrix.

This application has the following beneficial effects.
Regarding the multi-carrier DCSK signal reconstruction method provided in this application, the information bit sequence to be transmitted is modulated and subjected to cross-multiplication with the chaotic signal to obtain an original information-bearing matrix, which is reconstructed by means of a predetermined reconstruction matrix. A transmission symbol to be transmitted to a receiving end is generated based on the obtained information-bearing reconstruction matrix and the reference signal matrix, such that the receiving end, according to the same reconstruction matrix, demodulates the received transmission symbol, thereby restoring the information bits to be transmitted. By using the DCSK signal processing method based on signal reconstruction, the signal modulation and demodulation no longer depend on the autocorrelation between the reference signal and the original bearing signal, overcoming the technical problem that the traditional multi-carrier DCSK signal will undergo performance deterioration in a frequency-selective fading channel, resulting in reduced communication reliability.

BRIEF DESCRIPTION OF THE DRAWINGS

In order to illustrate the technical solutions in the embodiments of the present disclosure or the technical solutions in the prior art more clearly, the drawings required in the description of the embodiments or the prior art will be briefly described below.

Obviously, presented in the drawings are merely some embodiments of the present disclosure, which are not intended to limit the disclosure. For those skilled in the art, other drawings may also be obtained according to the drawings provided herein without paying creative efforts.

DETAILED DESCRIPTION OF EMBODIMENTS

Figure 1:
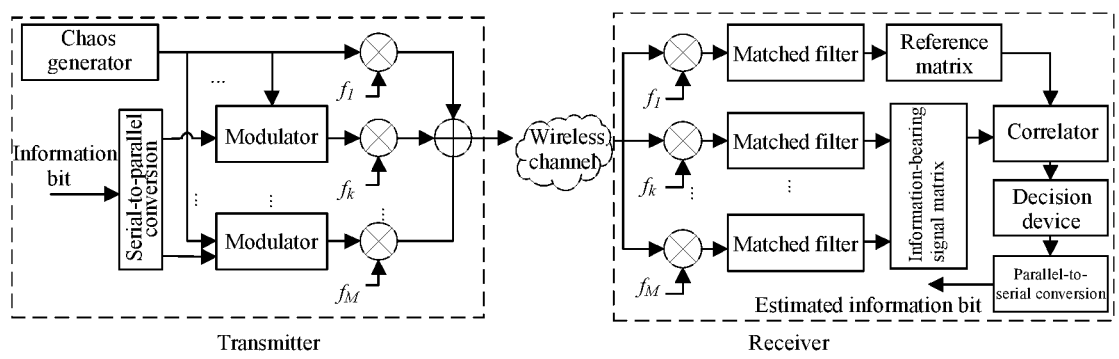
FIG. 1 is a schematic diagram of a conventional multi-carrier DCSK system.

The current DCSK communication technology is dominated by multi-carrier DCSK, which can be regarded as a parallel extension of the DCSK system. As shown in FIG. 1, the conventional multi-carrier DCSK system utilizes subcarriers of different frequencies to carry reference signals and information-bearing signals. Specifically, each frame of transmission symbols consists of M subcarriers of different frequencies. After the chaotic generator generates a chaotic signal ex with a length of $\beta$, $\varepsilon_x$ is carried by a subcarrier with a frequency of $f_1$ and is used as the reference signal of the k-th transmission symbol. Then, the chaotic signal ex and the parallel bits obtained after series-parallel conversion are inputted into the modulator, which carries the information bits by using the polarity of the chaotic signal. Finally, the information-bearing signals are used by the M−1 remaining subcarriers for transmission.

For ease of understanding, the k-th transmission symbol can be expressed as the M×$\beta$ matrix, where the rows of the matrix represent different frequencies, and the columns of the matrix represent different time slots:

$$e_k = \begin{pmatrix} \varepsilon_1 & \varepsilon_2 & \cdots & \varepsilon_\beta \\ b_{k,1}\varepsilon_1 & b_{k,1}\varepsilon_2 & \cdots & \varepsilon_\beta \\ \vdots & \vdots & \ddots & \vdots \\ b_{k,M-1}\varepsilon_1 & b_{k,M-1}\varepsilon_2 & \cdots & b_{k,M-1}\varepsilon_\beta \end{pmatrix}_{M\times\beta}$$

The above formula can also be expressed as:

$$e_k = [b_{k,0}, b_{k,1}, \ldots, b_{k,M-1}]^T \times \varepsilon_x,$$

where $[b_{k,0}, b_{k,1}, \ldots, b_{k,M-1}]^T$ is the information bit carried by the k-th transmission symbol, $b_{k,0} \equiv 1$ When the binary modulation is used, the number of information bit that can be transmitted in one frame of the system is M−1.

After receiving the signal by the receiving end, the matched filter separates the signals of different carriers to obtain the reference matrix $A_{1\times\beta}$ and the information-bearing matrix $B_{(M-1)\times\beta}$, respectively. Then, the matrices $A_{1\times\beta}$ and $B_{(M-1)\times\beta}$ perform the relevant operation to obtain the judgment variable matrix $C_{(M-1)\times1}$, and the judgment variable matrix $C_{(M-1)\times1}$ is expressed as:

$$C_{(M-1)\times1} = B_{(M-1)\times\beta} \times (A_{1-\beta})^T.$$

After obtaining the judgment variable matrix, the information bit carried by the k-th transmission symbol can be estimated by using the judgment rule as follows:

$$\tilde{b}_{k,m} = \begin{cases} 1 & C_{m,1} > 0 \\ 0 & \text{Otherwise} \end{cases}, m = 1, \ldots M-1.$$

Finally, the obtained parallel information bit is subjected to a parallel-to-serial conversion to output the final serial information bit.

Applicant has found that the conventional multi-carrier DCSK system can only obtain good BER performance in the flat fading channel conditions, and the performance of the conventional multi-carrier DCSK scheme will deteriorate under frequency-selective fading channels. To address this problem, the applicant found that because the conventional multi-carrier DCSK scheme uses subcarriers of different frequencies to carry the reference signal and the information-bearing signals, and under in the frequency-selective fading channel conditions, the good autocorrelation between the reference signal and the information-bearing signals will be destroyed due to the fact that the channel responses and delays of the subcarriers of different frequencies are different. In this case, the reference signal will not be able to be used as a reference for the information-bearing signal, resulting in the information bit not being recovered.

In view of this case, the present disclosure provides a reconstruction method and device for a multi-carrier DCSK signal to solve the technical problem of low communication reliability in the existing multi-carrier DCSK communication systems.

The technical solutions of the disclosure will be described in detail below in combination with the drawings in the embodiments to make the objects, features, and advantages of the disclosure clearer. Obviously, described below are merely some embodiments of the disclosure, which are not intended to limit the disclosure. For those skilled in the art, other embodiments obtained based on these embodiments without paying creative efforts should fall within the scope of the disclosure defined by the appended claims.

Figure 2:
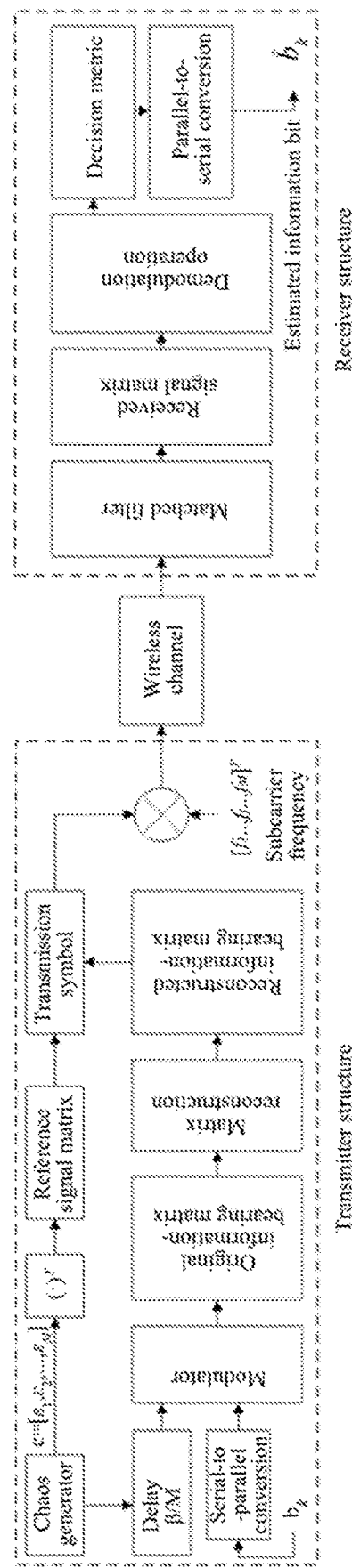
FIG. 2 schematically shows a structure of a multi-carrier DCSK system according to an embodiment of the present disclosure.
Figure 3:
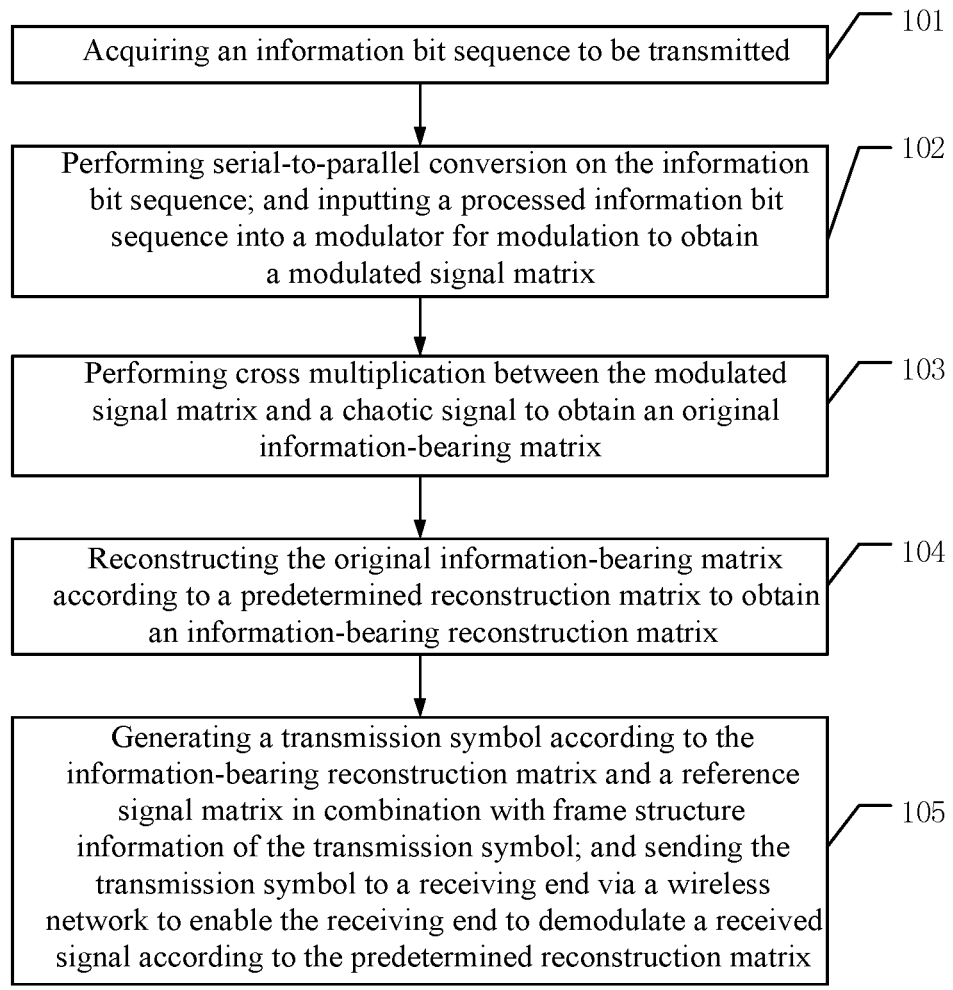
FIG. 3 is a flow chart of a multi-carrier DCSK signal reconstruction method according to an embodiment of the present disclosure.

Referring to FIGS. 2 and 3, the reconstruction method for a multi-carrier DCSK signal includes the following steps.

(S101) An information bit sequence to be transmitted is acquired.

(S102) The information bit sequence is processed by serial-to-parallel conversion.

The processed information bit sequence is input into a modulator for modulation to obtain a modulated signal matrix.

It is to be noted that the information bit sequence to be transmitted is first obtained at the transmitting terminal. The information bits are mapped to the polarity of the chaotic signal in the subcarrier. Specifically, $b_k = [b_{k,1}, b_{k,2}, \ldots, b_{k,j}, \ldots, b_{k,M}]$ is the information bit matrix carried by the k-th transmission symbol, where $b_{k,j} \in \{0,1\}$. Then, the serial information bit sequence $b_k$ is converted into the parallel sequence and input into the modulator to obtain the modulated signal matrix $s_k = [s_{k,1}, s_{k,2}, \ldots, s_{k,j}, \ldots, s_{k,M}]^T$, where $s \in \{-1,1\}$, and $(\cdot)^T$ denotes a substitution operation.

(S103) The cross multiplication is performed between the modulated signal matrix and a chaotic signal to obtain an original information-bearing matrix.

The chaotic generator generates the chaotic signal $c = [c_1, c_2, \ldots, c_i, c_\beta]$, where $i = 1, 2, \ldots, \beta$, $\beta$ is the length of the chaotic signal, $\beta$ satisfies $\beta|M$, and "|" denotes an integer division symbol. Therefore, the chaotic signal c can also be represented as $C = [\varepsilon_1, \varepsilon_2, \ldots, \varepsilon_j, \varepsilon_M]$, where $j = 1, 2, \ldots, M$, $\varepsilon_k = [c_{(j-1)\beta/M+1}, \ldots, c_{j\beta/M}]$. To illustrate the principle of the reconstruction matrix-assisted multi-carrier DCSK system, a vector $\varepsilon_j$ is regarded as an element in a matrix in the matrix transformation process.

Based on the modulated signal matrix obtained in S102 and the chaotic signal generated by the chaos generator, the modulated signal matrix $s_k$ and the chaotic signal c are cross-multiplied to obtain the original information-bearing matrix $e_{k,inf}$, expressed as follows:

$$e_{k,inf} = s_k \times c$$

$$= \begin{bmatrix} s_{k,1}\varepsilon_1 & s_{k,1}\varepsilon_2 & \cdots & s_{k,1}\varepsilon_M \\ s_{k,2}\varepsilon_1 & s_{k,2}\varepsilon_2 & \cdots & s_{k,2}\varepsilon_M \\ \vdots & \vdots & \ddots & \vdots \\ s_{k,M}\varepsilon_1 & s_{k,M}\varepsilon_2 & \cdots & s_{k,M}\varepsilon_M \end{bmatrix}_{M \times M};$$

$$= [s_{k,1}c, \ldots, s_{k,j}c, \ldots, s_{k,M}c]^T$$

where the rows of the matrix represent the frequencies, and the columns of the matrix represent times.

(S104) According to the predetermined reconstruction matrix, the original information-bearing matrix is reconstructed to obtain the information-bearing reconstruction matrix.

Then, based on the original information-bearing matrix obtained in the previous step, the original information-bearing matrix is reconstructed using the predetermined reconstruction matrix to obtain the information-bearing reconstruction matrix.

Figure 4:
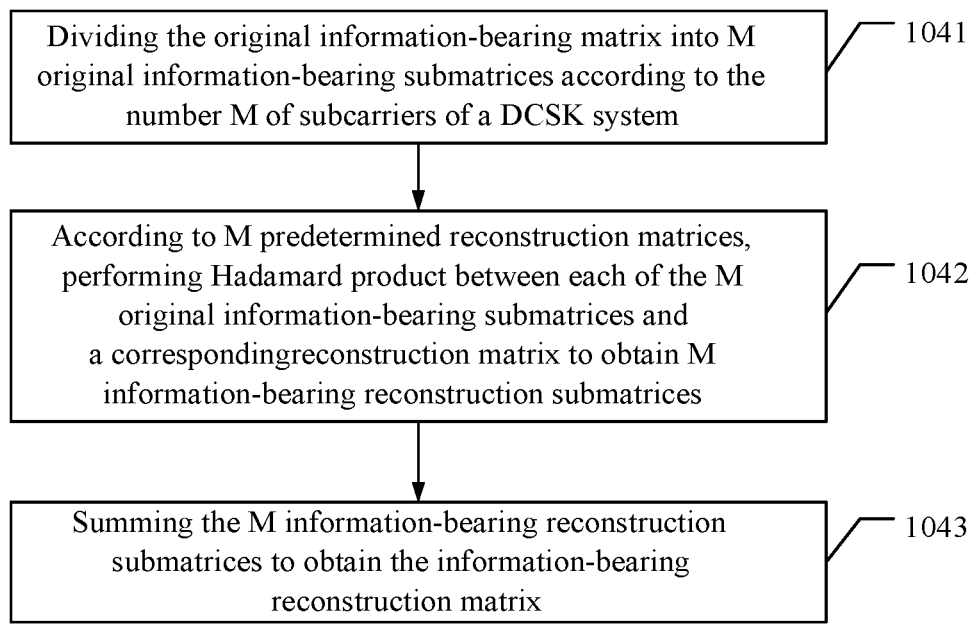
FIG. 4 is a flow chart of step (104) of the multi-carrier DCSK signal reconstruction method according to an embodiment of the present disclosure.

As shown in FIG. 4, the step 104 includes the following steps.

(S1041) The original information-bearing matrix is divided into M original information-bearing submatrices according to the number M of subcarriers of a DCSK system.

(S1042) According to M predetermined reconstruction matrices, a Hadamard product is respectively performed between each of the M original information-bearing submatrices and a corresponding predetermined reconstruction matrix to obtain M information-bearing reconstruction submatrices.

(S1043) The M information-bearing reconstruction submatrices are summed to obtain the information-bearing reconstruction matrix.

It should be noted that in the frequency-selective fading channel, the channel response of each subcarrier is independent. In this embodiment, in order to obtain the frequency diversity, the reconstruction matrix $\Lambda$ is used to reconstruct the information-bearing matrix. There are M reconstruction submatrices per frame of the transmission symbols. Each row of the information-bearing matrix (i.e., each information-bearing subcarrier) corresponds to one reconstruction matrix. The j-th subcarrier corresponds to the reconstruction matrix $\Lambda_j$.

The reconstruction matrix satisfies the following three conditions.

(1) The number of rows and the number of columns of the reconstruction matrix $\Lambda_j$ correspond to the number M of subcarriers of the DCSK system, i.e., M rows and M columns.

(2) Each reconstruction matrix must satisfy that only one element in each row and column is "1", and all other elements are "0".

(3) The sum of the M reconstruction matrices for each frame of the transmission symbols is the unity matrix of M rows and M columns, i.e., $\Lambda_1+\Lambda_2+ \ldots +\Lambda_M=I_{M \times M}$.

To introduce the matrix reconstruction by taking the j-th subcarrier as an example, the Hadamard product operation is performed on $s_{k,1}c^T$ and $\Lambda_j$ to generate a reconstructed information-bearing submatrix $\hat{e}_{k,inf,j}$, expressed as:

$$\hat{e}_{k,inf,j}=[s_{k,j}\varepsilon_1, s_{k,j}\varepsilon_2 \ldots s_{k,j}\varepsilon_M]^T \odot \Lambda_j.$$

In above formula, $\odot$ denotes the Hadamard product operation. Without loss of generality, assuming that $\Lambda_1$ is a diagonal matrix, the reconstructed information-bearing submatrix can be expressed as:

$$e_{k,inf,j} = \begin{bmatrix} s_{k,j}\varepsilon_1 & 0 & \cdots & 0 \\ 0 & s_{k,j}\varepsilon_2 & \cdots & 0 \\ \vdots & \vdots & \ddots & \vdots \\ 0 & 0 & \cdots & s_{k,M}\varepsilon_M \end{bmatrix}_{M \times M}.$$

Thus, after the above reconstruction operation, M reconstructed information-bearing submatrix can be obtained. Then, the reconstructed information-bearing matrices are obtained by summing M reconstructed information-bearing submatrices.

$$\hat{e}_{k,inf}=\hat{e}_{k,inf,1}+\hat{e}_{k,inf,2} \cdots +\hat{e}_{k,inf,j} \cdots +\hat{e}_{k,inf,M}.$$

(S105) According to the information-bearing reconstruction matrix and the reference signal matrix, a transmission symbol is generated by combining the frame structure information of the transmission symbol. The transmission symbol is used to be sent to the receiving end through the wireless network, to enable the receiving end to demodulate the received signal according to the reconstruction matrix.

Figure 5:
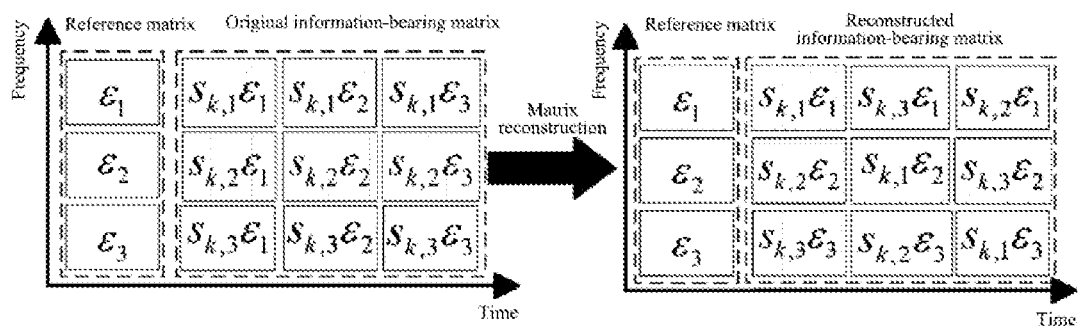
FIG. 5 shows a frame structure of the transmission symbol before and after the reconstruction when the number M of subcarriers is 3.

Then, elements of the chaotic signal are equally distributed according to the number of subcarriers of the DCSK system to obtain the reference signal matrix $e_{k,ref}=[\varepsilon_1, \varepsilon_2, \ldots, \varepsilon_M]^T$. The transmission symbol $e_{k,tra}$ is generated, the k-th transmission symbol $e_{k,tra}$ can be expressed as $e_{k,tra}=[e_{k,ref}, e_{k,inf}]$, where $e_{k,tra}$ is a matrix of M rows and $\beta(M+1)/M$ columns. The spreading factor of the system is $\beta(M+1)/M$. In order to illustrate the above reconstruction operation more clearly, the frame structure of the transmission symbols when the number of subcarriers is 3 is shown in FIG. 5. Finally, the k-th transmission symbol is similarly reconstructed as $\hat{e}_{k,tra}=[e_{k,ref}, \hat{e}_{k,inf}]$.

Finally, the transmission symbol $\hat{e}_{k,tra}=[e_{k,ref}, \hat{e}_{k,ref}]$ is sent to the receiving end via the wireless network to enable the receiving end to demodulate the received signal according to the predetermined reconstruction matrix, thereby restoring the information bit to be transmitted.

In an embodiment, the received signal is demodulated by the receiving end according to the predetermined reconstruction matrix through the following steps.

The receiving end performs filter matching on the received signal and obtains a received signal matrix in combination with a predetermined channel response model matrix. The received signal matrix is decomposed into a reference matrix and an information-bearing matrix.

Based on the reference matrix, the information-bearing matrix, and the predetermined reconstruction matrix, a decision metric matrix is calculated. The received signal is restored based on the decision metric matrix in combination with a decision rule.

It is to be noted that k-th transmission symbols are sent to the receiver through the frequency-selective multipath fading channel. The channel response is assumed to remain constant over a symbol period. Thus, the channel response can be modeled as a matrix form as follows:

$$H = \left[ \sum_{l=1}^{L_1} h_l \delta(t - \tau_l), \ldots, \sum_{l=1}^{L_M} h_l \delta(t - \tau_l) \right]^T.$$

In the multipath fading channel, $L_M$ is the number of paths of the M-th subcarrier. $h_l$ and $\tau_l$ denote the fading coefficient and delay of the l-th path, respectively. Therefore, after the received signal passes through the matched filter, the received signal matrix $R_{k,rec}$ can be obtained as:

$$R_{k,rec}=[e_{k,ref}, \hat{e}_{k,inf}] \otimes H+N.$$

In above formula, ⊗ represents a convolution symbol; and $N=[N_1, \ldots, N_M]^T$ represents the Additive White Gaussian Noise (AWGN). In order to estimate the information bits, the received signal matrix $R_{k,rec}$ is divided into the reference matrix $R_{k,ref}$ and the information-bearing matrix $R_{k,inf}$. The decision metric matrix $D_{k,j}$ corresponding to the information bit $b_{k,j}$ is obtained by matrix operation. The decision metric matrix $D_{k,j}$ is expressed as:

$$D_{k,j}=R_{k,ref}*V\odot\Lambda_j\odot R_{k,inf};$$

where $R_{k,ref}$ is the reference matrix; $R_{k,inf}$ is the information-bearing matrix; * is a Kronecker product operation; V is an all-ones matrix with a size of 1×M; and $\Lambda_j$ is the predetermined reconstruction matrix.

It can be seen from the above formula that to recover the information bit at the receiving end, it is necessary to know the reconstruction matrices used at the transmitting end, as well as the order of the subcarriers corresponding to each reconstruction matrix, thereby completing the demodulation process at the receiving end. This greatly improves the information security of the DCSK system.

Finally, the elements of the decision metric matrix $D_{k,j}$ are summed to obtain the final decision metric $\hat{D}_{k,j}$. Finally, the decision metrics are inputted into the decision threshold to estimate the information bits $\hat{b}_{k,j}$, and the decision rules are as follows:

$$\hat{b}_{k,j} = \begin{cases} 1 & \hat{D}_{k,j} > 0 \\ 0 & \text{Otherwise} \end{cases}, j = 1, \ldots M.$$

Described above is the detailed description of embodiments of the multi-carrier DCSK signal reconstruction method in the disclosure. Compared with the existing multi-carrier DCSK technology, the present disclosure provides a reconstruction matrix-assisted multi-carrier DCSK system considering the characteristics of frequency-selective fading channels. The conventional multi-carrier DCSK schemes are developed under the assumption of flat fading channels, and do not have the feasibility of operating in frequency-selective fading channels. The scheme in the present disclosure has performance advantages over the conventional multi-carrier DCSK schemes both under flat fading channels and under frequency-selective fading channels, as shown in FIG. 6 and FIG. 7.

Figure 6:
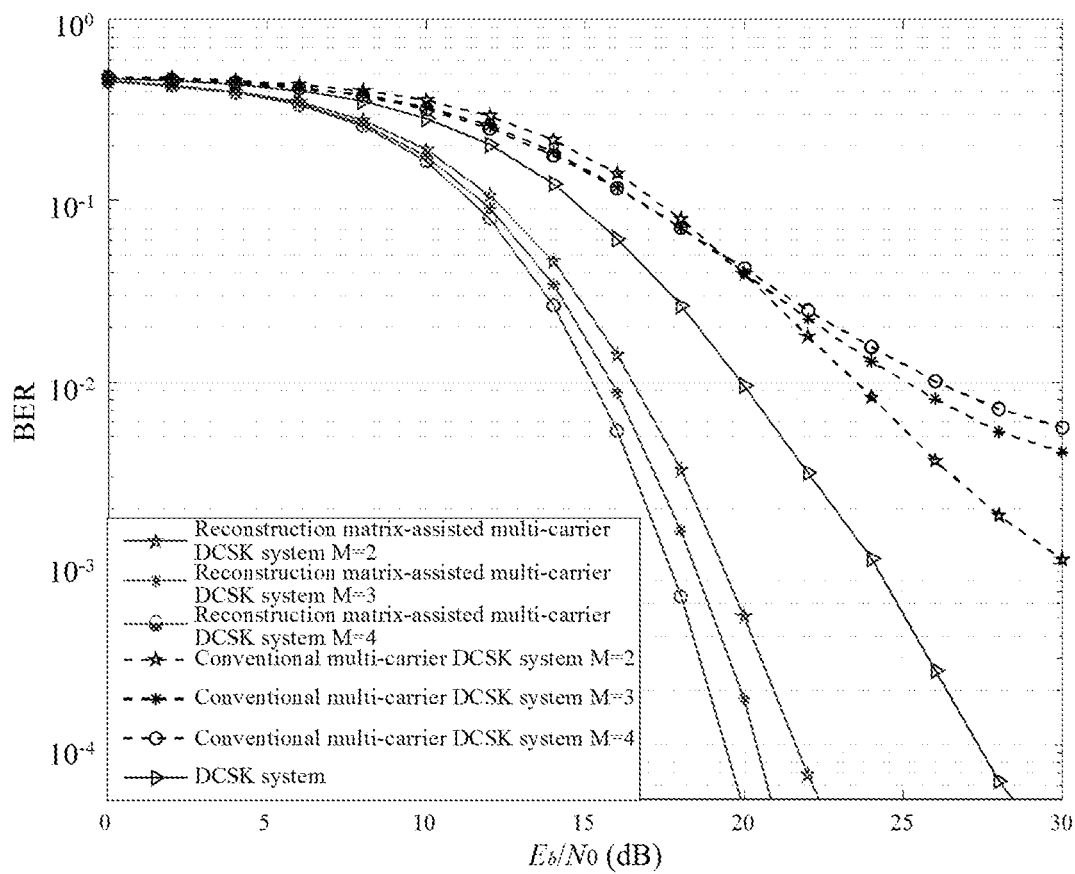
FIG. 6 shows comparison of BER performances of a reconstruction matrix-assisted multi-carrier DCSK system, the conventional multi-carrier DCSK system, and a DCSK system in a frequency-selective fading channel.
Figure 7:
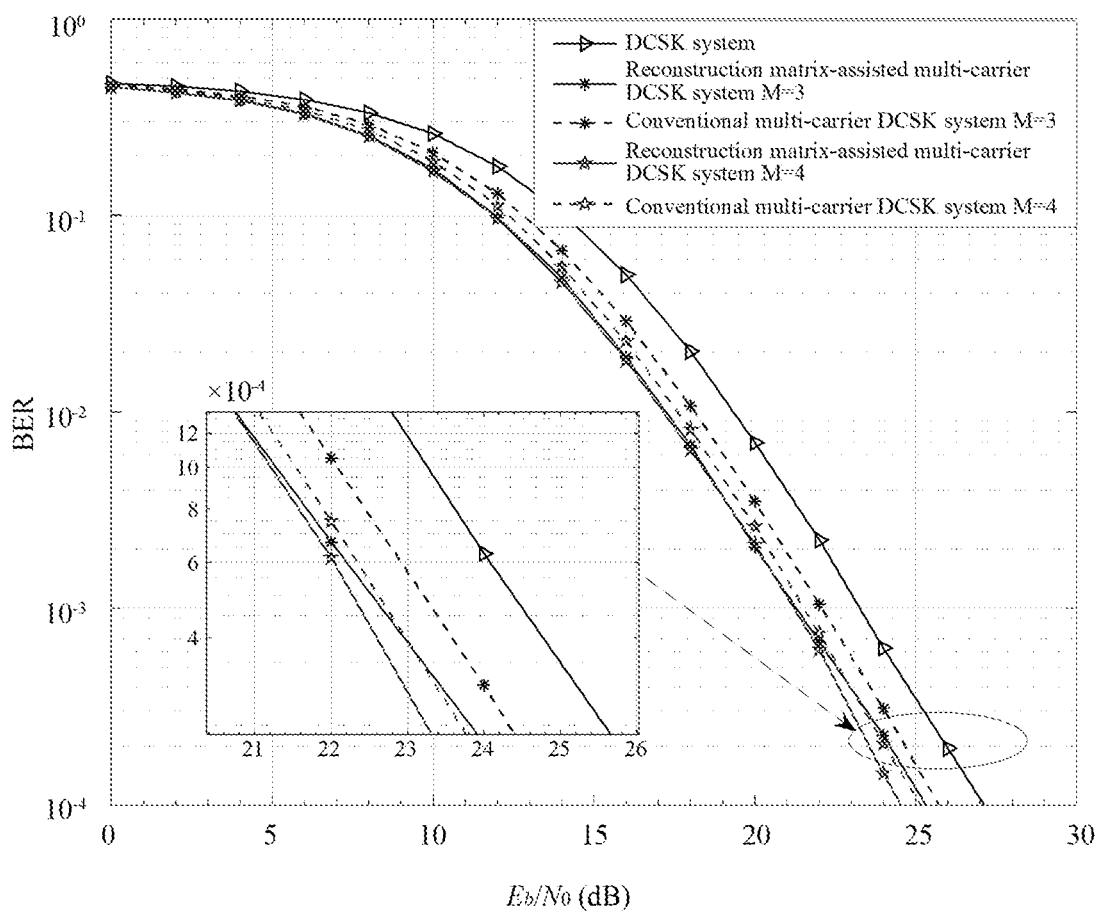
FIG. 7 shows comparison of BER performances of the reconstruction matrix-assisted multi-carrier DCSK system, the conventional multi-carrier DCSK system, and the DCSK system in a flat fading channel.

FIG. 6 illustrates comparison of BER performances of the reconstruction matrix-assisted multi-carrier DCSK system, the conventional multi-carrier DCSK system, and the DCSK system under the frequency-selective fading channel, where the spreading factor is set to 240, and the number of subcarriers is set to 2, 3, and 4, respectively. FIG. 7 provides a comparison of BER performance of the reconstruction matrix-assisted multi-carrier DCSK system, the conventional multi-carrier DCSK system, and the DCSK system under the flat fading channel, where the spreading factor is set to 180, and the number of subcarriers is 3 and 4, respectively. It can be known that the reconstruction matrix-assisted multi-carrier DCSK system provided in the present disclosure is more universally applicable.

The reconstruction device for a multi-carrier DCSK signal will be further described in detail.

Figure 8:
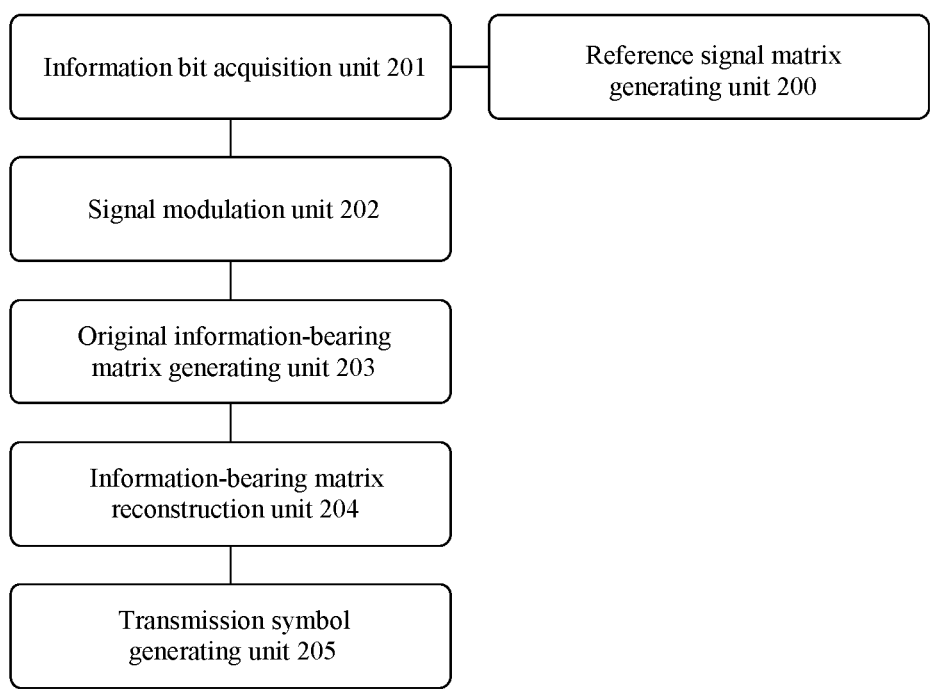
FIG. 8 schematically shows a structure of a multi-carrier DCSK signal reconstruction device according to an embodiment of the present disclosure.

Referring to FIG. 8, in this embodiment, the multi-carrier DCSK signal reconstruction device includes an information bit acquisition unit 201, a signal modulation unit 202, an original information-bearing matrix generating unit 203, an information-bearing matrix reconstruction unit 204, and a transmission symbol generating unit 205.

The information bit acquisition unit 201 is configured for acquiring the information bit sequence to be transmitted.

The signal modulation unit 202 is configured for processing the information bit sequence by serial-to-parallel conversion, and inputting the processed information bit sequence into the modulator for modulation to obtain the modulated signal matrix.

The original information-bearing matrix generating unit 203 is configured for performing cross multiplication on the modulated signal matrix and the chaotic signal to obtain the original information-bearing matrix.

The information-bearing matrix reconstruction unit 204 is configured for reconstructing the original information-bearing matrix according to the predetermined reconstruction matrix to obtain the information-bearing reconstruction matrix.

The transmission symbol generating unit 205 is configured for generating the transmission symbol according to the information-bearing reconstruction matrix and the reference signal matrix in combination with frame structure information of the transmission symbol, and sending the transmission symbol to the receiving end via the wireless network to enable the receiving end to demodulate the received signal according to the predetermined reconstruction matrix.

In an embodiment, the information-bearing matrix reconstruction unit 204 is further configured for dividing the original information-bearing matrix into M original information-bearing submatrices according to the number M of subcarriers of the DCSK system; according to M predetermined reconstruction matrices, performing the Hadamard product between each of the M original information-bearing submatrices and the corresponding predetermined reconstruction matrix to obtain M information-bearing reconstruction submatrices; and summing the M information-bearing reconstruction submatrices to obtain the information-bearing reconstruction matrix.

In an embodiment, the receiving end is configured for performing filter matching for the received signal, and obtaining the received signal matrix in combination with the predetermined channel response model matrix; decomposing the received signal matrix into the reference matrix and the information-bearing matrix; and calculating the decision metric matrix based on the reference matrix, the information-bearing matrix, and the predetermined reconstruction matrix; and restoring the received signal based on the decision metric matrix in combination with the decision rule.

In an embodiment, the received signal matrix is expressed as:

$$R_{k,rec}=[e_{k,ref}\hat{e}_{k,inf}]\otimes H+N;$$

where $R_{k,rec}$ is the received signal matrix; $e_{k,ref}$ is the reference signal matrix; $e_{k,inf}$ is the information-bearing reconstruction matrix; H is the predetermined channel response model matrix; and N is the AWGN matrix.

In an embodiment, the decision metric matrix is expressed as:

$$D_{k,j}=R_{k,ref}*V\odot\Lambda_j\odot R_{k,inf};$$

where $R_{k,ref}$ is the reference matrix; $R_{k,inf}$ is the information-bearing matrix; * is a Kronecker product operation; V is an all-ones matrix with a size of 1×M; and $\Lambda_j$ is the predetermined reconstruction matrix.

In an embodiment, the reconstruction device further includes a reference signal matrix generating unit 200. The reference signal matrix generating unit is configured for equally distributing elements of the chaotic signal according to the number of subcarriers of the DCSK system to obtain the reference signal matrix.

It should be understood by those skilled in the art, for brevity, the specific processes of the terminals, devices and units described above can be referred to the corresponding processes in the foregoing embodiments of the method and will not be repeated herein.

In the embodiments in the disclosure, the devices and methods may be realized in other ways. For example, the above-described embodiments of the device are merely schematic. The units are divided merely according to a logical function and may be divided in other ways when implemented. For example, multiple units or components may be combined or may be integrated into another system, or some features may be omitted or not implemented. In addition, the coupling or direct coupling or communication connection shown or discussed may be coupled through an intermediate medium such an interface, device, or unit, which may be electrical, mechanical or in other ways.

The used terms "first", "second", etc., are used to distinguish similar objects and cannot be understood as indicating or implying relative importance. In addition, the terms "comprising" and "having", and any variations thereof are open-ended terms, and should be interpreted as "including but not limited to". For example, a process, method, system, product, or device comprising a series of steps or units should not be limited to these clearly listed, but rather may include those steps or units that are not clearly listed.

The units illustrated as separate components may or may not be physically separated. The components shown as units may or may not be physical units, for example, the components may be in a single place or may be distributed over a plurality of network units. Some or all of these units may be selected to fulfill the purpose of the technical solution according to actual needs.

In addition, the various functional units in the embodiments of the present disclosure may be integrated in a single processing unit, or the individual units may be physically present separately, or two or more units may be integrated in a single unit. The integrated unit may be realized either in the form of hardware or in the form of a software functional unit.

The integrated unit may be stored in a computer-readable storage medium if realized in the form of a software functional unit and sold or used as a separate product. Based on this understanding, the technical solution of the present disclosure, in essence or as a contribution to the prior art, or all or part of the technical solution, may be embodied in the form of a software product. The software product is stored in a storage medium comprising a number of instructions to enable a computer device (which may be a personal computer, a server, or a network device, etc.) to carry out all or part of the steps of the method described in various embodiments of the disclosure. The aforementioned storage medium includes a USB flash disk, a removable hard disk, a read-only memory (ROM), a random access memory (RAM), a diskette or a CD-ROM, and other media that can store program code.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A reconstruction method for a multi-carrier Differential Chaos Shift Keying (DCSK) signal, comprising:
   acquiring an information bit sequence to be transmitted;
   processing the information bit sequence by serial-to-parallel conversion; and inputting a processed information bit sequence into a modulator for modulation to obtain a modulated signal matrix;
   performing cross multiplication on the modulated signal matrix and a chaotic signal to obtain an original information-bearing matrix;
   reconstructing the original information-bearing matrix according to a predetermined reconstruction matrix to obtain an information-bearing reconstruction matrix; and
   generating a transmission symbol according to the information-bearing reconstruction matrix and a reference signal matrix in combination with frame structure information of the transmission symbol; and sending the transmission symbol to a receiving end via a wireless network to enable the receiving end to demodulate a received signal according to the predetermined reconstruction matrix.

2. The reconstruction method of claim 1, wherein the step of "reconstructing the original information-bearing matrix according to a predetermined reconstruction matrix to obtain the information-bearing reconstruction matrix" comprises:
   dividing the original information-bearing matrix into M original information-bearing submatrices according to the number M of subcarriers of a DCSK system;
   according to M predetermined reconstruction matrices, performing a Hadamard product between each of the M original information-bearing submatrices and a corresponding predetermined reconstruction matrix to obtain M information-bearing reconstruction submatrices; and
   summing the M information-bearing reconstruction submatrices to obtain the information-bearing reconstruction matrix.

3. The reconstruction method of claim 1, wherein the received signal is demodulated by the receiving end according to the predetermined reconstruction matrix through steps of:
   performing filter matching, by the receiving end, for the received signal, and obtaining a received signal matrix in combination with a predetermined channel response model matrix; and decomposing the received signal matrix into a reference matrix and an information-bearing matrix; and
   calculating a decision metric matrix based on the reference matrix, the information-bearing matrix, and the predetermined reconstruction matrix; and restoring the received signal based on the decision metric matrix in combination with a decision rule.

4. The reconstruction method of claim 3, wherein the received signal matrix is expressed as:

$$R_{k,rec}=[e_{k,ref}\hat{e}_{k,inf}]\otimes H+N;$$

wherein $R_{k,rec}$ is the received signal matrix; $e_{k,ref}$ is the reference signal matrix; $\hat{e}_{k,inf}$ is the information-bearing reconstruction matrix; H is the predetermined channel response model matrix; and N is an Additive White Gaussian Noise (AWGN) matrix; and
the decision metric matrix is expressed as:

$$D_{k,j}=R_{k,ref}*V\odot\Lambda_j\odot R_{k,inf};$$

wherein $R_{k,ref}$ is the reference matrix; $R_{k,inf}$ is the information-bearing matrix; * is a Kronecker product operation; V is an all-ones matrix with a size of 1×M; and $\Lambda_1$ is the predetermined reconstruction matrix.

5. The reconstruction method of claim 1, wherein the reference signal matrix is generated through steps of:
equally distributing elements of the chaotic signal according to the number of subcarriers of a DCSK system to obtain the reference signal matrix.

6. A reconstruction device for a multi-carrier DCSK signal, comprising:
an information bit acquisition unit;
a signal modulation unit;
an original information-bearing matrix generating unit;
an information-bearing matrix reconstruction unit; and
a transmission symbol generating unit;
wherein the information bit acquisition unit is configured for acquiring an information bit sequence to be transmitted;
the signal modulation unit is configured for processing the information bit sequence by serial-to-parallel conversion, and inputting a processed information bit sequence into a modulator for modulation to obtain a modulated signal matrix;
the original information-bearing matrix generating unit is configured for performing cross multiplication on the modulated signal matrix and a chaotic signal to obtain an original information-bearing matrix;
the information-bearing matrix reconstruction unit is configured for reconstructing the original information-bearing matrix according to a predetermined reconstruction matrix to obtain an information-bearing reconstruction matrix; and
the transmission symbol generating unit is configured for generating a transmission symbol according to the information-bearing reconstruction matrix and a reference signal matrix in combination with frame structure information of the transmission symbol, and sending the transmission symbol to a receiving end via a wireless network to enable the receiving end to demodulate a received signal according to the predetermined reconstruction matrix.

7. The reconstruction device of claim 6, wherein the information-bearing matrix reconstruction unit is further configured to perform:
dividing the original information-bearing matrix into M original information-bearing submatrices according to the number M of subcarriers of a DCSK system;
according to M predetermined reconstruction matrices, performing a Hadamard product between each of the M original information-bearing submatrices and a corresponding predetermined reconstruction matrix to obtain M information-bearing reconstruction submatrices; and
summing the M information-bearing reconstruction submatrices to obtain the information-bearing reconstruction matrix.

8. The reconstruction device of claim 6, wherein the receiving end is configured for:
performing filter matching for the received signal, and obtaining a received signal matrix in combination with a predetermined channel response model matrix;
decomposing the received signal matrix into a reference matrix and an information-bearing matrix; and
calculating a decision metric matrix based on the reference matrix, the information-bearing matrix, and the predetermined reconstruction matrix; and restoring the received signal based on the decision metric matrix in combination with a decision rule.

9. The reconstruction device of claim 8, wherein the received signal matrix is expressed as:

$$R_{k,rec} = [e_{k,ref} \hat{e}_{k,inf}] \otimes H + N;$$

wherein $R_{k,rec}$ is the received signal matrix; $e_{k,ref}$ is the reference signal matrix; $\hat{e}_{k,inf}$ is the information-bearing reconstruction matrix; H is the predetermined channel response model matrix; and N is an Additive White Gaussian Noise (AWGN) matrix; and
the decision metric matrix is expressed as:

$$D_{k,j} = R_{k,ref} * V \odot \Lambda_j \odot R_{k,inf};$$

wherein $R_{k,ref}$ is the reference matrix; $R_{k,inf}$ is the information-bearing matrix; * is a Kronecker product operation; V is an all-ones matrix with a size of 1×M; and $\Lambda_1$ is the predetermined reconstruction matrix.

10. The reconstruction device of claim 6, further comprising:
a reference signal matrix generating unit;
wherein the reference signal matrix generating unit is configured for equally distributing elements of the chaotic signal according to the number of subcarriers of a DCSK system to obtain the reference signal matrix.

* * * * *